US010048780B2

(12) United States Patent
DePue et al.

(10) Patent No.: US 10,048,780 B2
(45) Date of Patent: Aug. 14, 2018

(54) ADJUSTMENT OF AN OPTICAL TRACKING DEVICE

(71) Applicant: Microsoft Technology Licensing, LLC, Redmond, WA (US)

(72) Inventors: Marshall T. DePue, Issaquah, WA (US); David M. Lane, Sammamish, WA (US); Stephen C. Klein, Bothell, WA (US); Brian L. Hastings, Fort Collins, CO (US); David D. Bohn, Fort Collins, CO (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 618 days.

(21) Appl. No.: 14/064,796

(22) Filed: Oct. 28, 2013

(65) Prior Publication Data
US 2014/0049471 A1 Feb. 20, 2014

Related U.S. Application Data

(63) Continuation of application No. 12/204,824, filed on Sep. 5, 2008, now Pat. No. 8,570,194.

(51) Int. Cl.
*H03M 11/00* (2006.01)
*G06F 3/038* (2013.01)
(Continued)

(52) U.S. Cl.
CPC ............ *G06F 3/038* (2013.01); *G06F 3/0317* (2013.01); *G06F 3/03543* (2013.01)

(58) Field of Classification Search
CPC ............................ G06F 3/0317; G06F 3/038
(Continued)

(56) References Cited

U.S. PATENT DOCUMENTS

| 7,071,922 B2 | 7/2006 | Sun et al. |
| 7,161,582 B2 | 1/2007 | Bathiche et al. |

(Continued)

FOREIGN PATENT DOCUMENTS

| DE | 202007005468 | 7/2007 |
| WO | WO-2005088435 | 9/2005 |
| WO | WO-2007005006 | 1/2007 |

OTHER PUBLICATIONS

"All you need to know about GAMING mouse", Retrieved at «http://forum.notebookreview.com/showthread.php?t=229459» on Jun. 20, 2008, 9 Pages.

(Continued)

*Primary Examiner* — Thienvu Tran
*Assistant Examiner* — Lucy Thomas

(57) ABSTRACT

Architecture for managing clutch height in an optical navigational device such as a computer mouse. In one embodiment for a mouse, a feature can be molded into the bottom case that limits the clutch height by occluding the reflected light to the image sensor when the device is lifted from the tracking surface. Tracking is disabled when the clutch height threshold is exceeded, and re-enabled when the device is brought under the distance clutch height threshold. The device includes firmware controlled algorithm adjustments to one or more correlation parameters. User interfaces may also be employed to implement various aspects of the embodiments discussed herein.

20 Claims, 13 Drawing Sheets

(51) Int. Cl.
*G06F 3/03* (2006.01)
*G06F 3/0354* (2013.01)
*G09G 5/08* (2006.01)
*G06F 3/033* (2013.01)

(58) Field of Classification Search
USPC .................... 341/41; 345/163, 164, 165, 166
See application file for complete search history.

(56) References Cited

U.S. PATENT DOCUMENTS

| | | | |
|---|---|---|---|
| 7,189,985 B2 | 3/2007 | Xie et al. | |
| 7,221,356 B2 | 5/2007 | Oliver et al. | |
| 7,263,242 B2 | 8/2007 | Kakarala et al. | |
| 7,388,283 B2 | 6/2008 | Grewal | |
| 7,760,185 B2 | 7/2010 | Joung et al. | |
| 7,795,697 B2 | 9/2010 | Grewal | |
| 8,570,194 B2 | 10/2013 | DePue et al. | |
| 2005/0035947 A1 | 2/2005 | Lutian | |
| 2005/0156874 A1* | 7/2005 | Kong | G06F 3/03543 345/156 |
| 2005/0156875 A1* | 7/2005 | Kong | G06F 3/03543 345/156 |
| 2005/0264531 A1 | 12/2005 | Tai et al. | |
| 2006/0044276 A1 | 3/2006 | Baer et al. | |
| 2006/0071907 A1 | 4/2006 | Joung et al. | |
| 2006/0091298 A1 | 5/2006 | Xie et al. | |
| 2006/0125794 A1 | 6/2006 | Afrait | |
| 2006/0209027 A1 | 9/2006 | Huang | |
| 2007/0008286 A1 | 1/2007 | Theytaz et al. | |
| 2007/0098286 A1 | 5/2007 | Kotoda | |
| 2007/0103439 A1 | 5/2007 | Gordon et al. | |
| 2007/0290991 A1 | 12/2007 | Bieber et al. | |
| 2007/0291001 A1 | 12/2007 | Trisnadi et al. | |
| 2007/0296699 A1 | 12/2007 | Bohn et al. | |
| 2008/0117412 A1 | 5/2008 | Leong et al. | |
| 2008/0167071 A1* | 7/2008 | Forstall | G06F 9/4451 455/556.2 |
| 2010/0060488 A1 | 3/2010 | Depue et al. | |

OTHER PUBLICATIONS

"Final Office Action", U.S. Appl. No. 12/204,824, (dated Jan. 6, 2012),12 pages.

"Final Office Action", U.S. Appl. No. 12/204,824, (dated Dec. 6, 2012),13 pages.

"Foreign Office Action", Chinese Application No. 200980135830.2, (dated Oct. 15, 2013), 6 Pages.

"Foreign Office Action", Chinese Application No. 200980135830.2, (dated Jan. 7, 2013), 10 pages.

"Foreign Office Action", Chinese Application No. 200980135830.2, (dated Jun. 5, 2013), 7 pages.

"International Search Report and Written Opinion", PCT Application No. PCT/US2009/05591, (dated Apr. 6, 2010),12 Pages.

"Lift Distance on Ikari Laser and Ikari Optical", Retrieved at—http://www.fragyou.net/2007/11/29/lift-distance-on-ikari-laser-and-ikari-optical/ on Jun. 20, 2008 (Nov. 27, 2009), 26 Pages.

"Non-Final Office Action", U.S. Appl. No. 12/204,824, (dated May 30, 2012),11 pages.

"Non-Final Office Action", U.S. Appl. No. 12/204,824, (dated Sep. 15, 2011), 9 pages.

"Notice of Allowance", U.S. Appl. No. 12/204,824, (dated Jun. 24, 2013), 8 pages.

"Supplemental Notice of Allowance", U.S. Appl. No. 12/204,824, (dated Sep. 25, 2013), 2 pages.

"Extended European Search Report", EP Application No. 09812247.6, dated Mar. 5, 2014, 8 pages.

"Foreign Office Action", CN Application No. 200980135830.2, dated Mar. 3, 2014, 6 Pages.

"Foreign Office Action", CN Application No. 200980135830.2, dated Jul. 14, 2014, 6 Pages.

"Foreign Notice of Allowance", CN Application No. 200980135830.2, dated Jan. 13, 2015, 4 Pages.

"Office Action Issued in European Patent Application No. 09812247.6", dated Jul. 13, 2017, 11 Pages.

* cited by examiner

ADJUSTMENT OF AN OPTICAL TRACKING DEVICE

RELATED APPLICATIONS

This application is a continuation of and claims priority to U.S. application Ser. No. 12/204,824, filed Sep. 5, 2008 and titled "Clutch-Height Adjustment in an Optical Tracking Device," the entire contents of which is hereby incorporated herein by reference in its entirety.

BACKGROUND

Computer input devices such as mice have been the mainstay device for most users interacting with a computing system. The mouse, as the principal computing navigation device, has evolved over recent years from the basic tethered single function mechanical pointing device using a surface contact ball to the wireless optical multi-function input device of today that can employ laser/LED light sources and image sensors. The control of inadvertent pointer tracking was solved in a straightforward way with the ball mouse, since when the user clutched the mouse from the tracking surface, the ball simply dropped away from the internal contract-driven linear tracking mechanism. However, along with this optical "sophistication" come additional problems such as processing reflected light from a variety of different navigation (tracking) surfaces and controlling tracking when the mouse leaves the tracking surface.

Clutch height is a parameter that must be addressed for control in an optical mouse. As the mouse is lifted off of the tracking surface, it is desirable to cease mouse tracking after a specified distance has been reached. Put differently, the user does not want to see the mouse pointer moving randomly on the display. This problem becomes particularly poignant for computer users that demand precise tracking control when moving the mouse off the tracking surface, such as for computers gamers, CAD operators, for example.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture includes optical, electrical, mechanical, and/or software techniques for adjusting the clutch height of a device relative to a tracking surface by setting a threshold on the clutch height. In one implementation, disclosed is a tracking assembly for tracking movement of the device relative to a tracking surface by emitting incident light on the tracking surface and sensing reflected light received from the tracking surface using an image sensor. An obfuscation component reduces an amount of the reflected light sensed by the image sensor in response to clutch of the device from the tracking surface. In one example, the obfuscation component provides an aperture mechanically configured to occlude a portion of the reflected light to the image sensor. A firmware component provides software and algorithms of which one or more parameters can be changed for adjusting the clutch-height threshold. Other techniques are also disclosed that facilitate user customization of the clutch-height parameters via a user interface, for example.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

Figure 1:
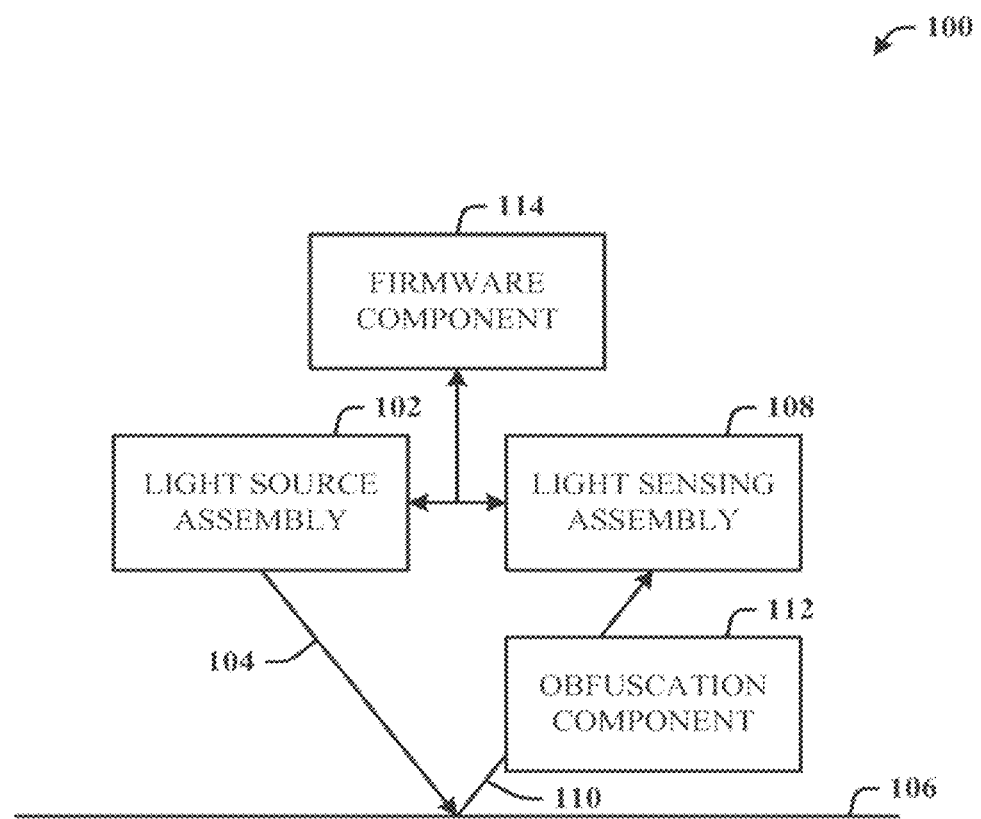
FIG. 1 illustrates a clutch-height adjustment system in accordance with the disclosed architecture.

The instant architecture discloses techniques for managing clutch height in an optical navigational device such as a computer mouse. In one particular technique for a mouse, one or more features can be molded into the bottom case of the mouse that limit the clutch height, for example the "D-shaped" optical port, by occluding portions of the reflected light on an image sensor that is received from the tracking surface. In another implementation, portions of the incident light can be occluded. It is to be understood that the term "occlude" and forms thereof as used herein are intended to mean "some or all" of the light can be blocked. Additionally, the mouse can include firmware controlled algorithm adjustments to change the autocorrelation or cross-correlation threshold heights. When employing the D-shape port (or aperture), a threshold can be placed on the z-axis height tracking distance using the mechanical feature, such as a knife-edge (the straight portion of the "D" shaped aperture), to impose a shadow across the mouse image sensor. The aperture can be custom designed to occlude a portion of the emitted light from an LED, for example.

The mechanical feature can be made adjustable for mechanically tolerancing of the optical device to preserve tracking while on-surface, and cease tracking off-surface. An illumination lens design is provided that tailors the emitted light in such a way as to cease tracking upon device lift-off. An adjustable bottom case aperture (or "slit width") allows the user to mechanically adjustable the clutch height by enlarging the aperture or making the aperture smaller. This can be relevant especially in gaming mouse products. Additionally, a software adjustable autocorrelation height threshold is facilitated that trades-off or limits tracking performance on some surfaces for user adjustable clutch height on other surfaces.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a clutch-height adjustment system 100 in accordance with the disclosed architecture. The system 100 includes a light source assembly 102 for emitting incident light 104 on a tracking surface 106, and light sensing assembly 108 for receiving reflected light 110 from the tracking surface 106. The light source assembly 102 and light sensing assembly 108 are employed in a device (e.g., mouse), for example, for tracking movement of the device relative to the tracking surface 106.

The system 100 also includes an obfuscation component 112 for reducing the amount of light sensed by the light sensing assembly 108 in response to clutch of the device from the tracking surface 106. The obfuscation component 112 can include at least one of a bottom case aperture, a bottom case feature, a diffractive optic illumination lens, or an illumination lens with total internal reflection geometry.

A technique for reducing the light sensed by the light sensing assembly 108 via the obfuscation component 112 can be mechanical means for occluding the reflected light (to impose a shadow on the light sensing assembly 108), such as an aperture configuration on the base housing of the device in which the system 100 is employed. The aperture can be the same optical port in the housing through which the incident light 104 is emitted onto the tracking surface 106 and through which the reflected light 110 is received onto the light sensing assembly 108. In other words, the aperture can be designed according to dimensions that begin partial blocking of the reflected light 110 that reaches the light sensing assembly 108 when the device is lifted from the tracking surface 106, thereby imposing a shadow on the sensing assembly 108.

The obfuscation component 112 can also be employed as a mechanical and suitably designed tab or other similar type of oblation internal to the device housing to obtain the similar effect of reducing the amount of reflected light 110 that reaches the light sensing assembly 108 when the height of the device relative to the tracking surface 106 increases.

The light source assembly 102 can include a light emitting element such as an LED (light emitting diode), laser source, and one or more lenses and/or other optical components, power switching assembly (e.g., circuits) for turning the light emitting element on or off, etc., for directing the incident light 104 to the tracking surface 106.

The light sensing assembly 108 can include an image sensor (e.g., CCD-charge coupled device or CMOS) and, one or more lenses and/or other optical components for directing the reflected light 110 to the image sensor.

The system 100 can also include a firmware component 114 for onboard operations related to light integration on the image sensor for comparison to clutch-height threshold settings, controlling power to the light emitting element, supporting wire/wireless communications, supporting multi-function buttons and commands of the device in which the system 100 is employed, and so on. In other words, the system 100 can achieve the desired functionality and control using opto-electro-mechanical components, firmware control, and/or a software interface that facilitates vendor adjustable, as well as user-customizable system parameters.

Figure 2:
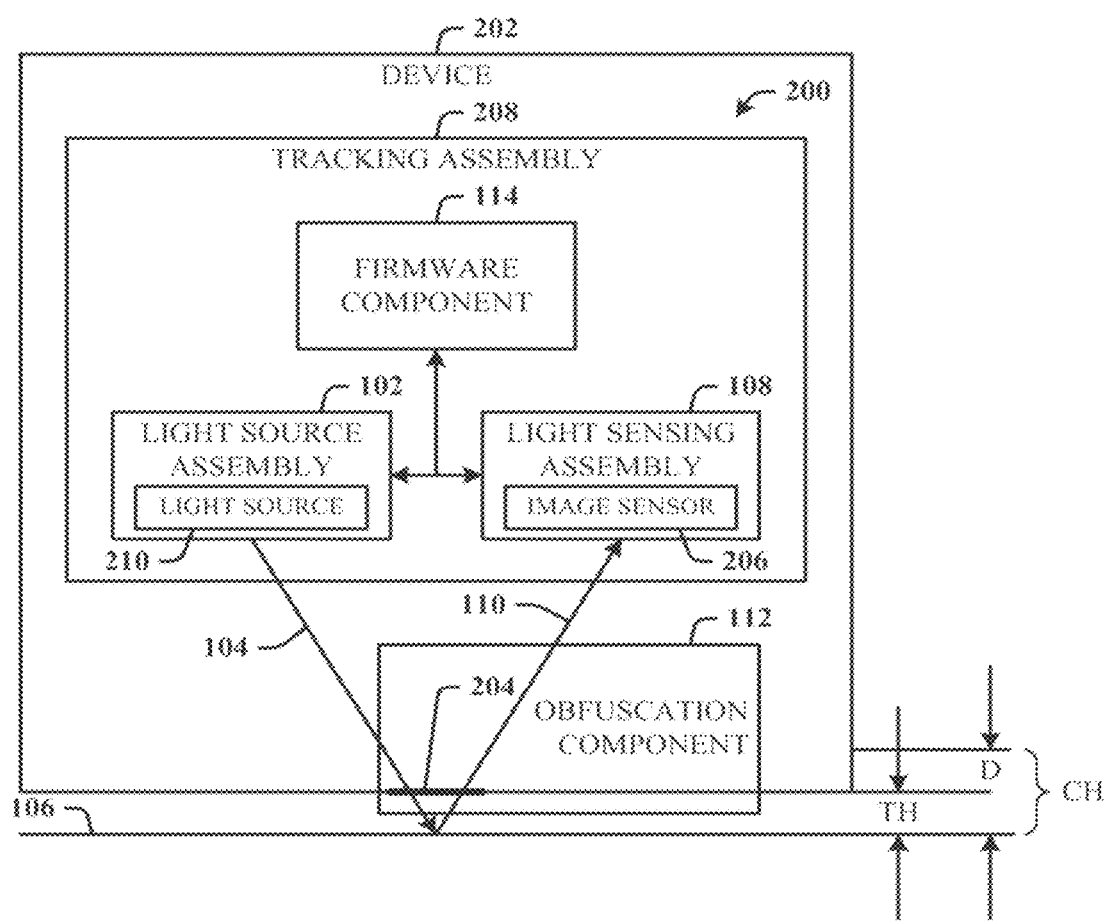
FIG. 2 illustrates an alternative embodiment of a clutch-height adjustment system in a device that employs an aperture to reduce the reflected light on an image sensor during device lift-off from the tracking surface.

FIG. 2 illustrates an alternative embodiment of a clutch-height adjustment system 200 in a device 202 that employs an aperture 204 to reduce the reflected light 110 on an image sensor 206 during device lift-off from the tracking surface 106. The system 200 includes a tracking assembly 208 for tracking movement of the device 202 relative to the tracking surface 106 by emitting the incident light 104 on the tracking surface 106 and sensing the reflected light 110 received from the tracking surface 106 using the image sensor 206 as part of the light sensing assembly 108. Here, the light source assembly 102, light sensing assembly 108, and firmware component 114 are shown as part of the tracking assembly 208. Alternatively, the obfuscation component 112 can also be considered part of the tracking assembly 208.

The light source assembly 102 can include an LED as a light source 210. There can be performance advantages to using LED over a laser light source. For example, the LED illumination emits a much more expansive beam than the laser (more focused) facilitating the ability to control and sculpt the light (incident and/or reflected) using opto-electro-mechanical device features to control the clutch height.

The obfuscation component 112 is provided for reducing the amount of the reflected light 110 sensed by the image sensor 206 in response to clutch of the device 202 from the tracking surface 106. Here, the obfuscation component 112 includes the aperture 204 which is mechanically configured to occlude a portion of the reflected light 110 to the image sensor 206. The tracking assembly 208 can also include the firmware component 114 for adjusting one or more parameters of an algorithm employed for computing a clutch-height threshold.

The tracking height (TH) is illustrated as the distance between the device (e.g., housing base) and the tracking surface 106. This can mean that the device 202 contacts the surface 106 or is proximate to the surface 106 when operating in the tracking mode. The clutch height (CH) is depicted as the tracking height plus some additional distance D such that when the device 202 is lifted off the tracking surface 106, there is provided the additional distance D of travel to the clutch height before tracking mode is turned off. This facilitates more leisurely use of the device 202, and hence, a more positive user experience, where the average user does not need to be overly concerned with maintain the device 202 in contact with the tracking surface 106. On the other hand, a power user (e.g., a gamer) may want a more stringent (reduced) clutch height to eliminate inadvertent off-surface tracking during game play. In reverse, when the device 202 is lowered closer to the tracking surface 106, once the clutch height is reached, tracking mode is resumed.

In support of customized adjustment of the clutch height, the firmware component 114 exposes the one or more correlation parameters for adjustment via a user interface. This can also include the adjustment of parameters for different tracking surfaces (e.g., carpet, more reflective surfaces, less reflective surfaces, gaming surfaces, etc.). The firmware component 114 can also report tracking data (e.g., autocorrelation data, cross-correlation data, etc.), clutch-height data (e.g., threshold level), and other information (e.g., model, firmware version, etc.) to a single-purpose application (e.g., a gadget) for presentation and viewing by a user.

The aperture 204 can include an edge (e.g., the straight edge in a "D" shaped aperture) that increasingly occludes the reflected light 110 to the image sensor 206 as the distance D from the tracking height increases. The tracking assembly 208 disables tracking of the device movement when the distance D reaches the clutch-height threshold.

Generally, the obfuscation component 112 increasingly occludes the reflected light 110 as the distance increases between the device and the tracking surface 106 (when starting from a surface contact position), and decreasingly occludes the reflected light 110 as the distance between the device and the tracking surface 106 decreases. Put another way, the obfuscation component 112 increasingly occludes the reflected light 110 as the distance D increases between the device tracking height and the tracking surface 106 (when starting from a surface contact position), and decreasingly occludes the reflected light 110 as the distance between the device and the tracking surface 106 decreases. As previously indicated, the light sensing assembly 108 disables the tracking mode when the increasing distance exceeds the clutch-height threshold, and enables the tracking mode when the decreasing distance meets and moves below the clutch-height threshold.

Figure 3:
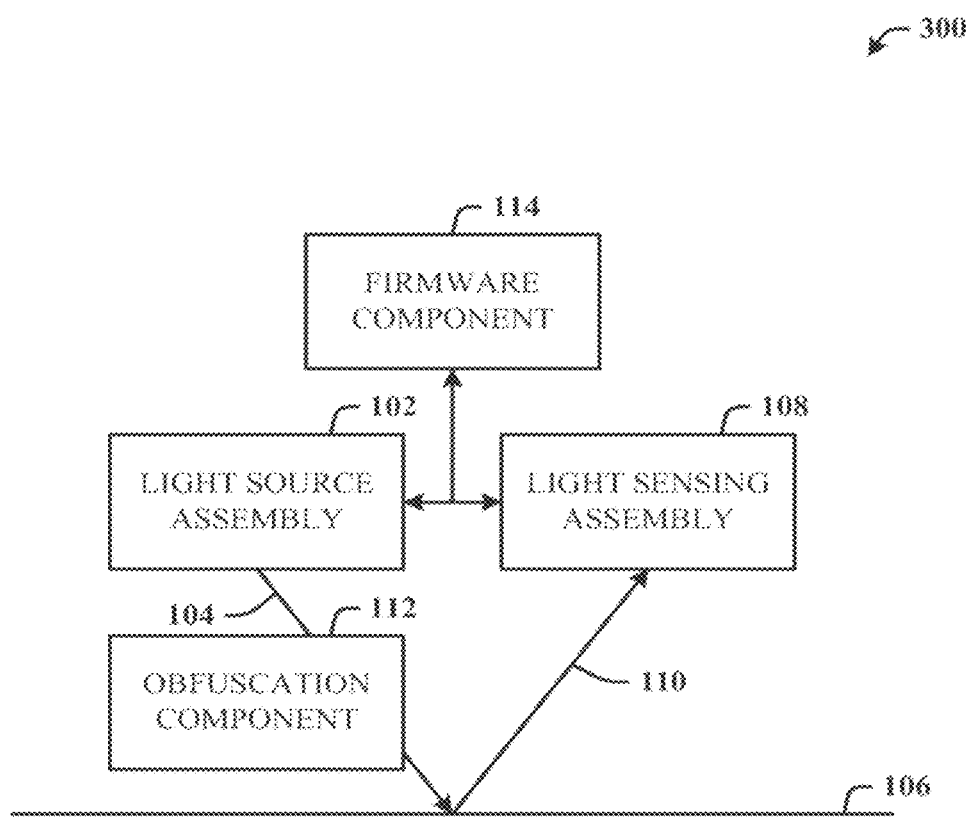
FIG. 3 illustrates an alternative embodiment of a clutch-height adjustment system where the obfuscation component can be employed in the incident light path to tailor the incident light based on lift-off of the tracking surface.

FIG. 3 illustrates an alternative embodiment of a clutch-height adjustment system 300 where the obfuscation component 112 can be employed in the incident light path to tailor the incident light 104 based on lift-off of the tracking surface 106. For example, a mechanical tilt component can be employed to variably and partially occlude the incident light 104 based on movement of the device off from the tracking surface 106. The amount of reflected light 110 is then reduced by the partial occlusion of the incident light 104, thereby reducing the overall amount of light to the light sensing assembly 108 (e.g., image sensor). When the amount of reflected light 110 sensed falls below a threshold, for example, the clutch height is determined to have been reached and the tracking functionality turned off. This can be achieved using opto-electro-mechanical components with firmware control, and user-adjustable software interface.

This alternative embodiment can also include including features in the incident path lens(es). For example, when the device experiences lift-off from the tracking surface 106, the obfuscation component 112 includes a lens, diffractive optical element or total-internal reflection geometry in the incident path that comprises a feature that variably diverts portions of the emitted light away from the tracking surface 106 based on the corresponding increase in lift distance, thereby reducing the amount of reflected light 110 sensed by the light sensing assembly 108. When the amount of light sensed by the sensing assembly 108 drops below a predetermined threshold, tracking mode is disabled. One such feature can be to design the lens to shape the illumination profile of the incident light into a D-shape, other than circular, such that during lift-off, the emitted light is increasingly directed to the straight vertical portion of the "D" causing diversion of a corresponding amount of the incident light 104 away from the light sensing assembly 108. Again, when the amount of light sensed by the sensing assembly 108 drops below a predetermined threshold, the tracking mode is disabled.

Similar to the system 100 and system 200, system 300 can also include the firmware component 114 for onboard operations related to light integration on the image sensor for comparison to clutch-height threshold settings, controlling power to the light emitting element, supporting wire/wireless communications, supporting multi-function buttons and commands of the device in which the system 100 is employed, and so on. In other words, the system 100 can achieve the desired functionality and control using opto-electro-mechanical components, firmware control, and/or a user-adjustable software interface.

Figure 4:
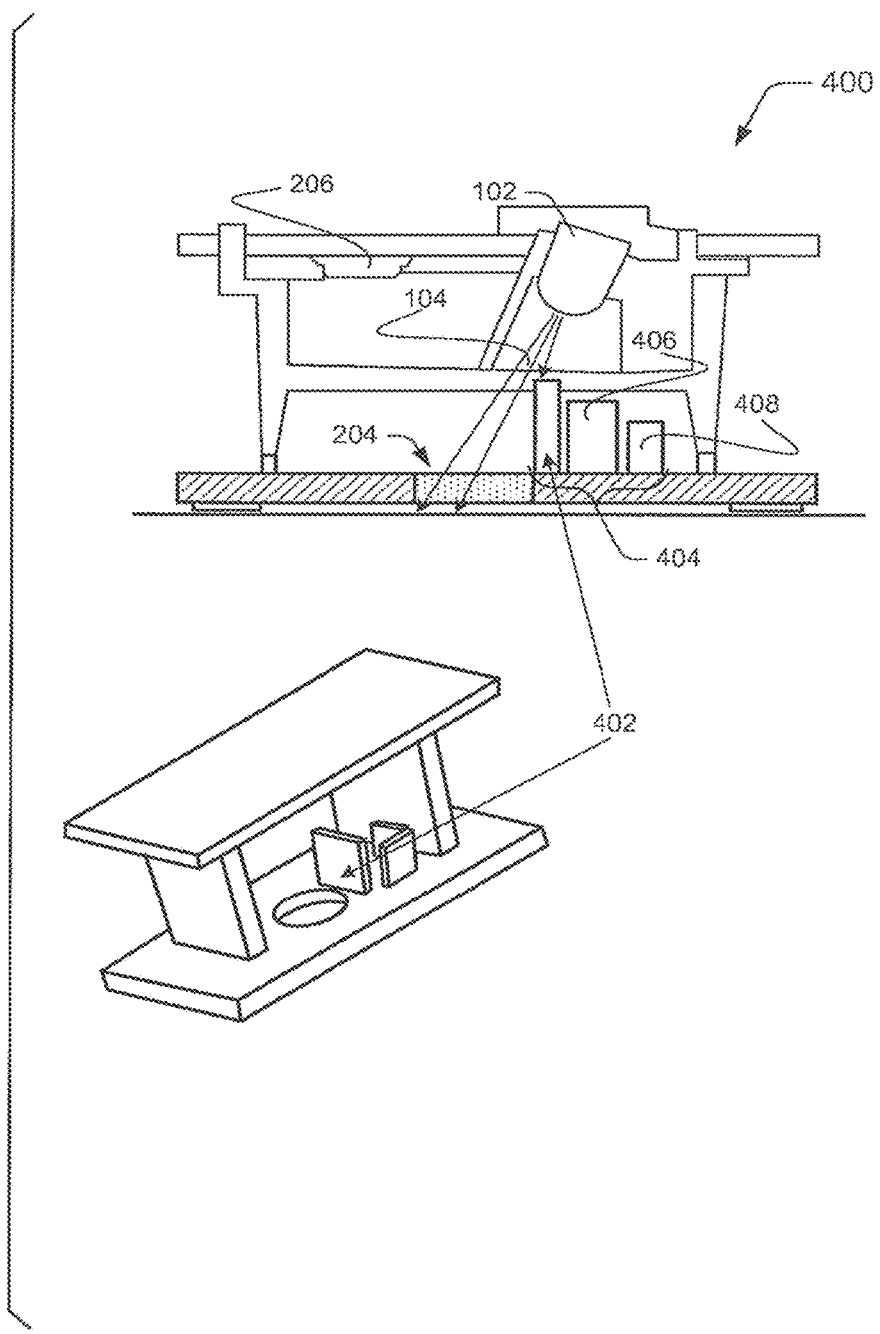
FIG. 4 illustrates a side view and oblique view of an obfuscation component in the source light path.

FIG. 4 illustrates a side and oblique views 400 of an obfuscation component in the source light path. Here, the light sources assembly 102 is an LED that emits light 104 through the port 204, and reflected light is captured on the light sensing assembly 206. However, a light baffle 402 (as a form of obfuscation component) extends vertically from the base to partially obstruct some of the emitted light 104 to form a relatively static shadow on the sensing assembly 206. The static shadow causes a portion of the image to appear fixed (not moving), and combined with the rest of the image being relatively "softer" due to out-of-focus when the device is clutched, the auto-correlation of the image is calculated as lower (softer), and tracking stops. The firmware described above can employ the adjustable threshold on correlation to tune the system to operate as desired.

Figure 5:
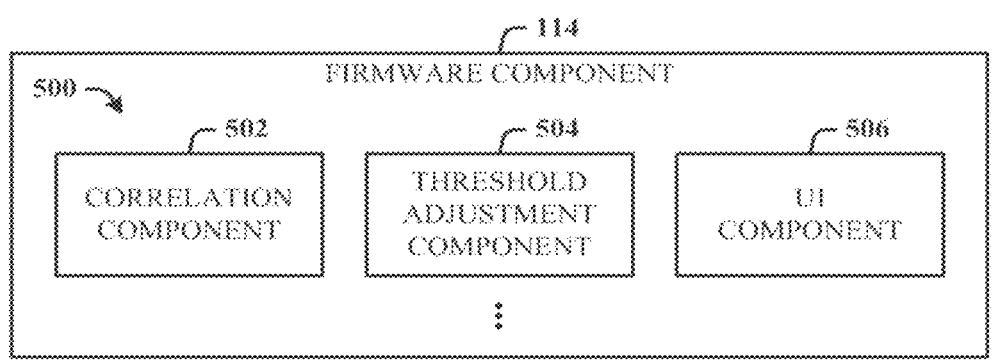
FIG. 5 illustrates one or more algorithms that can be provided in the firmware component in support of clutch-height adjustment.

FIG. 5 illustrates one or more algorithms 500 that can be provided in the firmware component 114 in support of clutch-height adjustment. The firmware component 114 can include a correlation component 502 that provide correlation processing such as autocorrelation and/or cross-correlation of image sensor light as the device is moved toward the clutch height. A threshold adjustment component 504 facilitates the adjustment of the clutch-height threshold and related parameters, such as correlation parameters for the correlation component 502. A user interface (UI) component 506 includes software such as an API that exposes firmware data and instructions, for example, to a UI via which the user can interact to manipulate settings and parameters.

With respect to correlation, when the device is in contact with the tracking surface an image is captured onto the image sensor. There can be gradations in illumination and other aspects that can be captured by the image sensor such as contrast that is related to the tracking surface. Generally, the image of the reflected light source on the image sensor forms an illumination dome (a brighter spot toward the center of the image sensor that rolls in contrast to the sensor edges). As the mouse is moved relative to the tracking surface, the image on the image sensor also moves, although the dome remains somewhat static. In other words, the image may be on one side of the sensor, moves into the dome area and then away from the dome area towards the darker corner of the image sensor.

The correlation component 502 includes one or more algorithms that process the relative contrast within a block of the image section by section and correlate the relative contrast rather than to the actual absolute intensity. Thus, as the image smoothly rolls off from bright to dark, for example, the algorithm(s) are able to follow and notice the motion of that same texture as the texture moves across the image sensor.

Consider another scenario where tracking is on a fairly subtle surface that has no actual printed or textured detail (e.g., a white material or piece of paper). The nature of the image that is focused onto the image sensor is relatively subtle but still detectable using the disclosed algorithm(s). Without employing the disclosed architecture, as the image is moved up on the sensor the amount of light begins to decrease and the shape of the illumination dome can shift. Moreover, the observable details on the tracking surface lose contrast and disappear because the image on the image sensor moves out of focus. The disclosed correlation component 502 tracks how much overall contrast (inherent detail) there is in the image (the autocorrelation). When the overall contrast drops below a certain contrast threshold level, the algorithm(s) interpret the tracking as lost and tracking is suspended until the contrast improves.

The contrast can vary in direct relationship to the tracking surface. This further indicates that the clutch height can be different for correspondingly different tracking surfaces. For example, on a very "strong" tracking surface, with high image contrast such as with a typical office desktop, there can be sufficient contrast that the clutch height can be set to be much higher than for a "weak" surface, such as paper, that does not provide much contrast. It is well understood that customer surfaces on which the device will be used, vary widely. Thus, manufacturers design devices using fixed settings that accommodate most surfaces such that the customers will have a positive experience when using the device.

However, power users (e.g., gamers) can be frustrated by these vendor settings. The firmware component 114 includes an adjustment "knob" that allows the power user to dictate how much autocorrelation to use by "dialing" down the clutch-height threshold. In other words, this can be adjusted based on the tracking surface and the particular application the customer is using.

Figure 6:
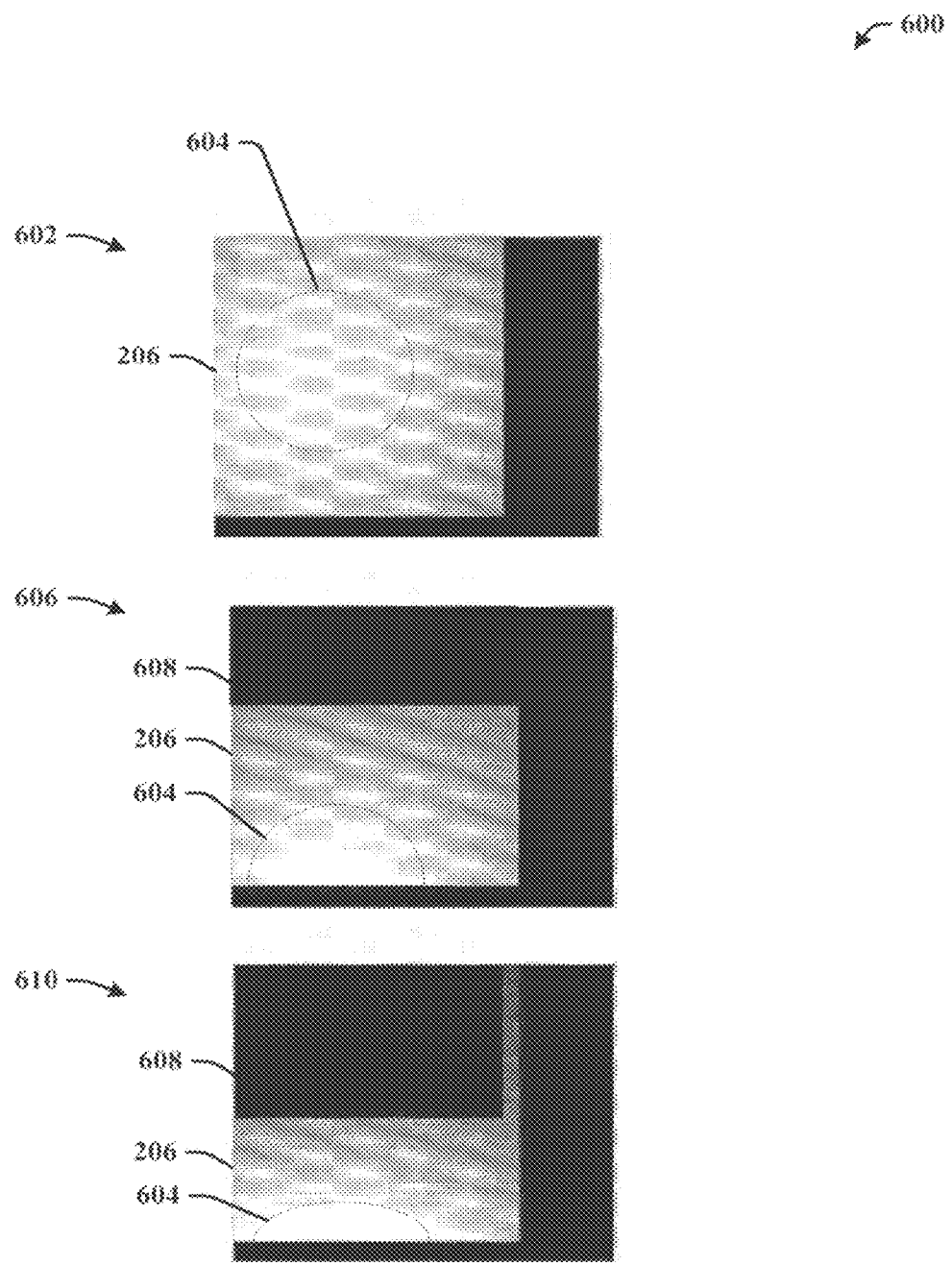
FIG. 6 illustrates a set of image sensor views of the illumination spot as the device is lifted off a mirror surface.

FIG. 6 illustrates a set of image sensor views 600 of the illumination spot as the device (e.g., a mouse) is lifted off a mirror surface. An initial tracking view 602 shows the image sensor 206 and an illumination dome 604 (generally indicated by the circle) substantially centered in the sensor field. The z-axis height is, or approximately is, zero.

In a second view 606, when the navigation device (e.g., mouse) is lifted from the tracking surface and approaches the clutch-height (e.g., z=2.0 millimeters), the dome center 604 has shifted by roughly one-half the length of the sensor array. The degree of tracking depends upon the surface contrast, and is particularly acute on faux-marble desks and dark surfaces. Here, a shadow 608 caused by obfuscation component (e.g., the aperture design, internal tabs, light cancellation/redirection techniques, etc.) begins to encroach on the sensor 206, affecting the overall contrast. If the clutch height has been reached, the amount (or size) of the shadow 608 can be set to ensure that the tracking mode is disabled. It may be the case that the second view 606 is not representative of the clutch height.

In a third view 610, the shadow 608 consumes even more of the sensor 206 as the illumination dome 604 continues to move off the sensor 206 causing the autocorrelation algorithm (and potentially other algorithms) to desire results indicating that the clutch-high threshold was reached.

Thus, the disclosed architecture combines mechanics with algorithms to provide various clutch height adjustment over a range of possible surfaces and environments (e.g., gaming, general usage, etc.).

In a more specific operational description, the sensor is operated to take a series of pictures in time. The algorithm(s) correlate features from picture to picture. At time T-1, surface features that correspond to some surface height roughness are imaged. At time T-2, the imaged surface features have moved. The time difference between the two images can be measured to know the velocity and distance. The imaging occurs much faster than the vertical change in height of the device. Accordingly, in the second view 606, the image sensor captures the surface features and the shadow 608, which appear to not change at all relative to the image capture and correlation process. In other words, the device can no longer track because the image sensed picture at time T-1 and T-2 includes the black shadow pattern that is not moving. Even when there may be changes in some feature content at the lower portion of the image sensor 206, the dominant image content is the static shadow that does not move. In response, the device stops tracking because it cannot distinguish between a small portion of the image content that is moving and the relatively larger black shadow that is not moving.

In operation, when the user picks the device off the surface the shadow begins to encroach more over the image sensor. The shadow, formed from a straight edged occlusion in this example, moves over rows of pixels until the overall contrast triggers disabling of the tracking mode.

It is to be appreciated that other aperture shapes can be employed in the opening of the bottom case, for example, of the mouse that strategically places a shadow feature. When the mouse is lifted the architecture of the geometry of the light changes so that the shadow then moves over the sensor so as to not affect the tracking.

Figure 7:
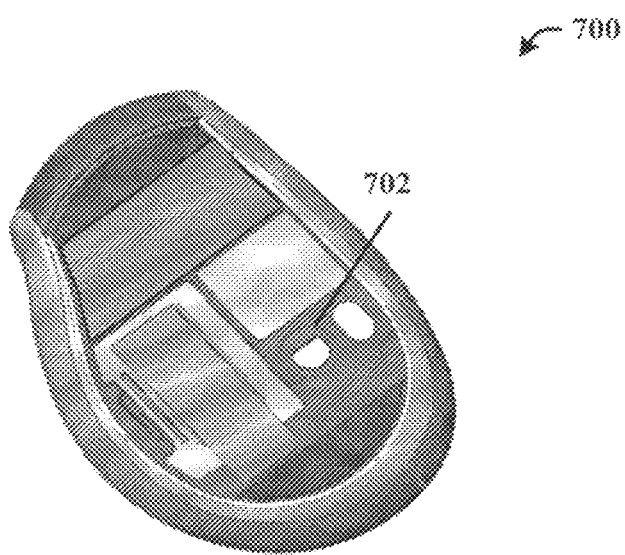
FIG. 7 illustrates one embodiment where a base of a mouse includes a "D-shaped" aperture where both incident and reflected rays transit for mouse tracking.

FIG. 7 illustrates one embodiment where a base of a mouse includes a "D-shaped" aperture where both incident and reflected rays transit for mouse tracking. As the mouse is lifted off-surface, the mouse sensor registers a shadow moving across the pixel array, as shown in FIG. 6. The shadow makes a large number of pixels on the image sensor "dark", thereby effectively terminating mouse tracking. The algorithm(s) are overwhelmed by the black, non-moving, fixed-pattern noise that is present in the image stream and responsively terminate the tracking mode. In other words, the relatively fixed shadow causes a portion of the image to appear fixed (non-moving), and combined with the rest of the image being "softer" due to out-of-focus, the autocorrelation of the image is calculated as lower (softer) and tracking stops.

Figure 8:
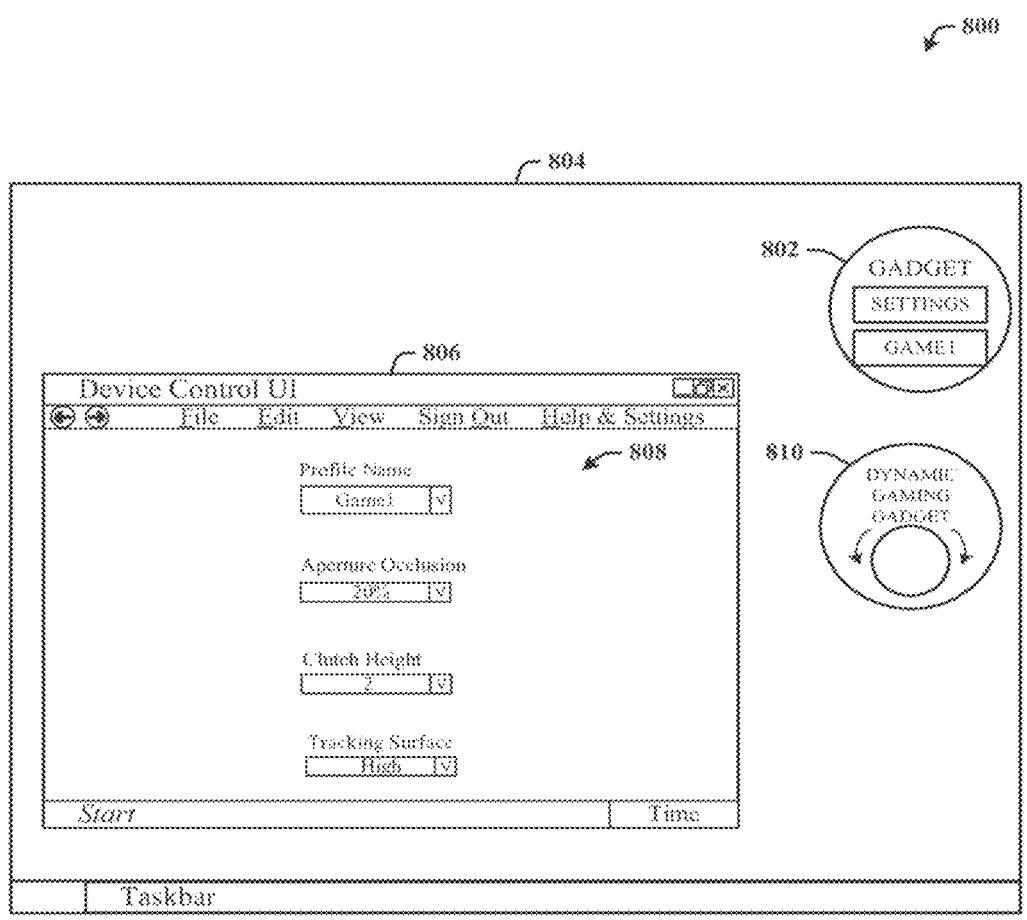
FIG. 8 illustrates one or more software interfaces for interacting with the navigational device algorithm(s) for parameter adjustments.

FIG. 8 illustrates one or more software interfaces 800 for interacting with the navigational device algorithm(s) for parameter adjustments. For example, a single-purpose application 802 (also referred to as a gadget, widget, etc.) presented on a computer desktop 804 can be employed to read and present current settings and other device information, or receive the settings and the other device information.

Alternatively, or in combination therewith, a device control UI 806 can be employed that facilitates user customization of one or more device settings 808. For example, the user can create a Profile Name that intuitively describes the purpose for which the settings are to be used such as for a first gaming application (Game1) or a word processing application (e.g., WPapp1). The profile name can then be reported to the gadget 802 for presentation to the current status of the device.

Additionally, the control UI 806 can allow the user to set the aperture occlusion, where an adjustable aperture is provided. The adjustable aperture approach can use an electro-mechanically driven rotating set of differently sized blockers, such that the user can customize the clutch height by programming rotation of one of the blockers (or tabs) over a portion of the aperture. This can be controlled via the control UI 806 as an Aperture Occlusion setting, as a percentage, for example. The control UI 806 can also provide a Clutch Height setting, where each setting auto-configures the firmware algorithm(s) with parameters that auto-set the clutch height to the selected setting (e.g., more stringent height for gaming, less stringent height for word processing). The control UI 806 can also facilitate setting of the clutch height based on the Tracking Surface, with settings such as High for a highly reflective surface, for example.

It is within contemplation of the disclosed architecture that a gadget can be used to select a Profile Name, which selection then pushes the associated settings to the firmware component for configuring the correlation algorithm(s), etc., which can be done on-the-fly. In a more robust implementation, the Control UI 806 can present a virtual knob that the user can turn to achieve the desired clutch height for a given application, or part of the application. The knob can also be presented as a Dynamic Gaming gadget 810, for example, that the user can manipulate during a computer game to fit the customized needs of the user. Manipulation automatically changes the clutch height settings to achieve the desired results.

Another alternative embodiment can include a combination of lenses that adjusts the depth of focus, rather than a specifically design aperture or adjustable aperture, for example. A narrow depth of focus will go out of focus quickly in response to off-surface activity of the device.

In yet another alternative embodiment, clutch-height processing can be based on a second image sensor of the device, or an IR LED and IR receiver setup using the appropriate angles. In still another alternative embodiment, an analog-to-digital (ADC) can be employed in combination with a photo transistor to dial-in where the light fall off, and use that setting as a baseline for clutch height. Another embodiment can employ contact sensors (e.g. proximity) that sense when the device is off-surface, and how far off-surface.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 9:
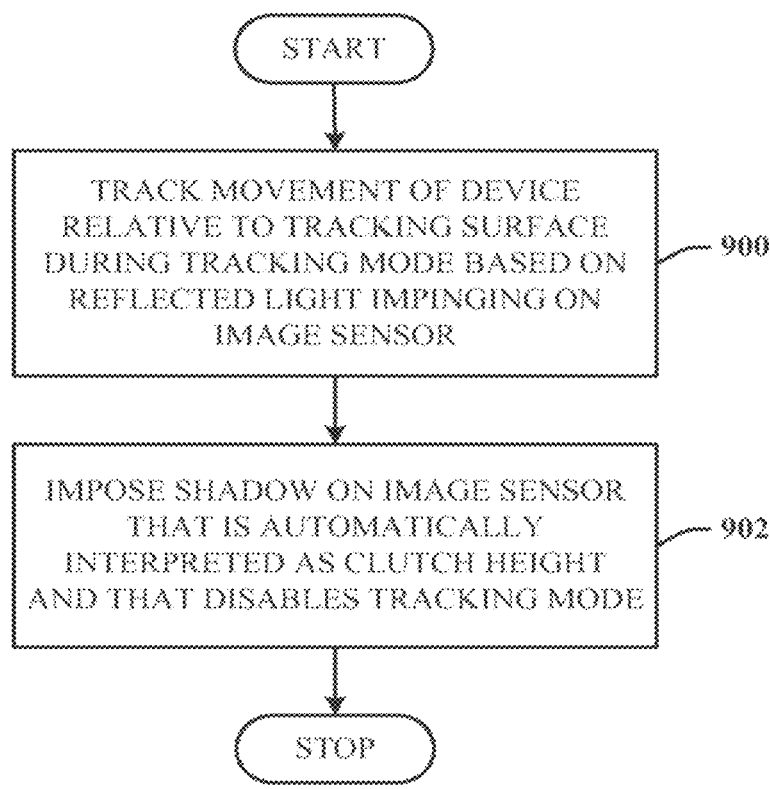
FIG. 9 illustrates a method of managing clutch height of a navigational device.

FIG. 9 illustrates a method of managing clutch height of a navigational device. At 902, movement of a device relative to a tracking surface is tracked during a tracking mode based on reflected light impinging on an image sensor. At 902, a shadow is imposed on the image sensor that is automatically interpreted as a clutch height that disables the tracking mode. The shadow is imposed by occlusion (or obfuscation) of a portion the reflected light on the image sensor. One or more algorithms are then run (from firmware) to perform correlation operations on the images and the shadow.

Figure 10:
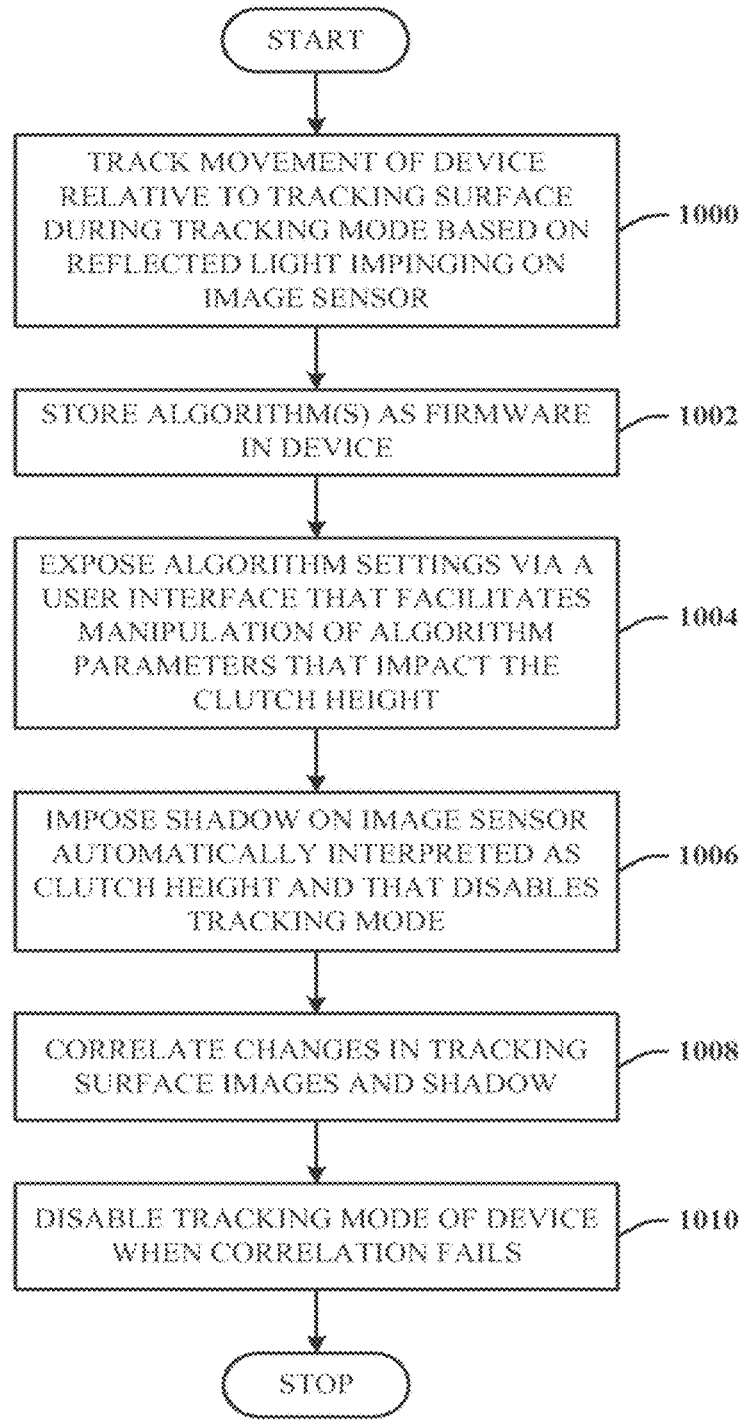
FIG. 10 illustrates a method of a method of managing clutch height using onboard algorithms.

FIG. 10 illustrates a method of a method of managing clutch height using onboard algorithms. At 1000, movement of the device relative to a tracking surface is tracked during a tracking mode based on reflected light impinging on an image sensor. At 1002, one or more algorithms are stored as firmware on the device. At 1004, algorithm settings are exposed via a user interface that facilitates manipulation of algorithm parameters that impact clutch height and that disable tracking mode. At 1006, a shadow is imposed on the image sensor that is automatically interpreted as a clutch height that disables the tracking mode. At 1008, changes in tracking surface images and the shadow are correlated (e.g., autocorrelated). At 1010, tracking mode is disabled on the device when the correlation fails.

Figure 11:
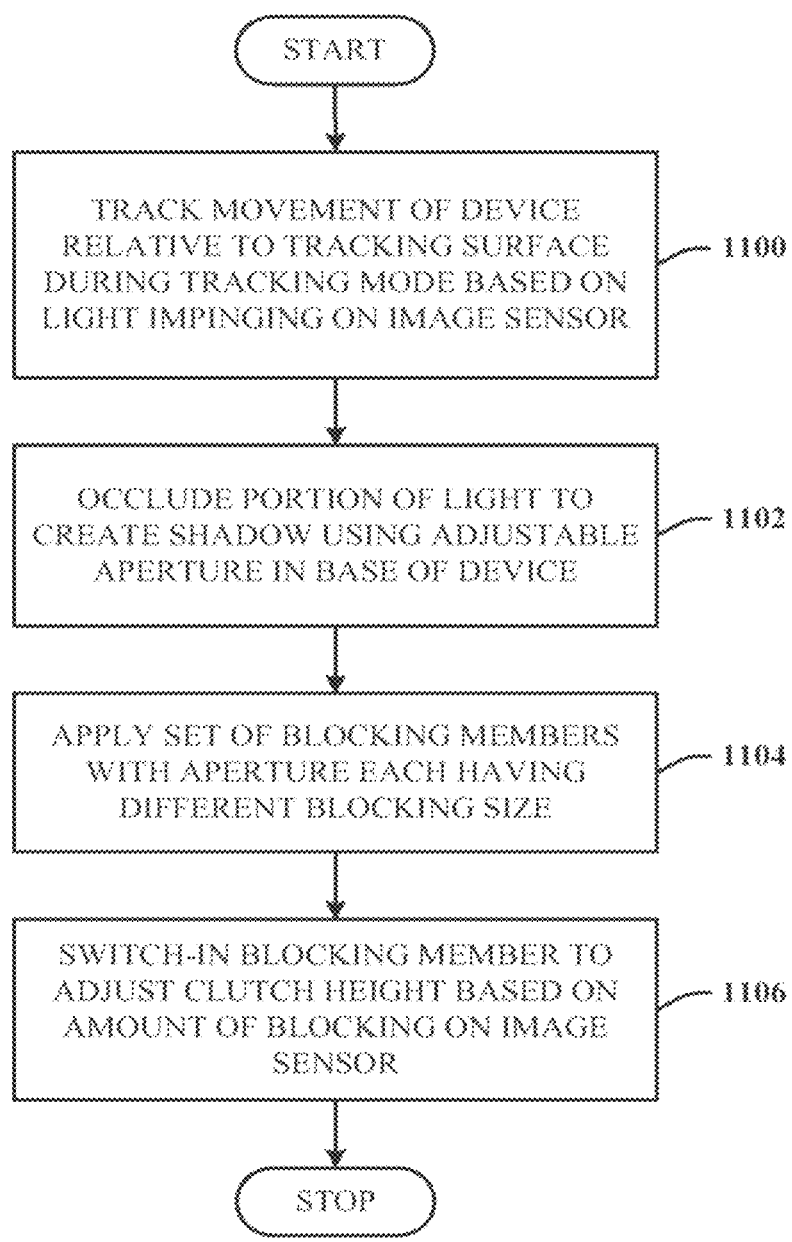
FIG. 11 illustrates a method managing clutch height using an adjustable aperture.

FIG. 11 illustrates a method managing clutch height using an adjustable aperture. At 1100, movement of the device relative to a tracking surface is tracked during a tracking mode based on reflected light impinging on an image sensor. At 1102, a portion of the reflected light is occluded to create a shadow on the image sensor using an adjustable aperture in the base of the device. At 1104, a set of blocking members is applied in association with the aperture each member having a different size. At 1106, a blocking member is switched-in to adjust the clutch height based on the amount of blocking on the image sensor.

Figure 12:
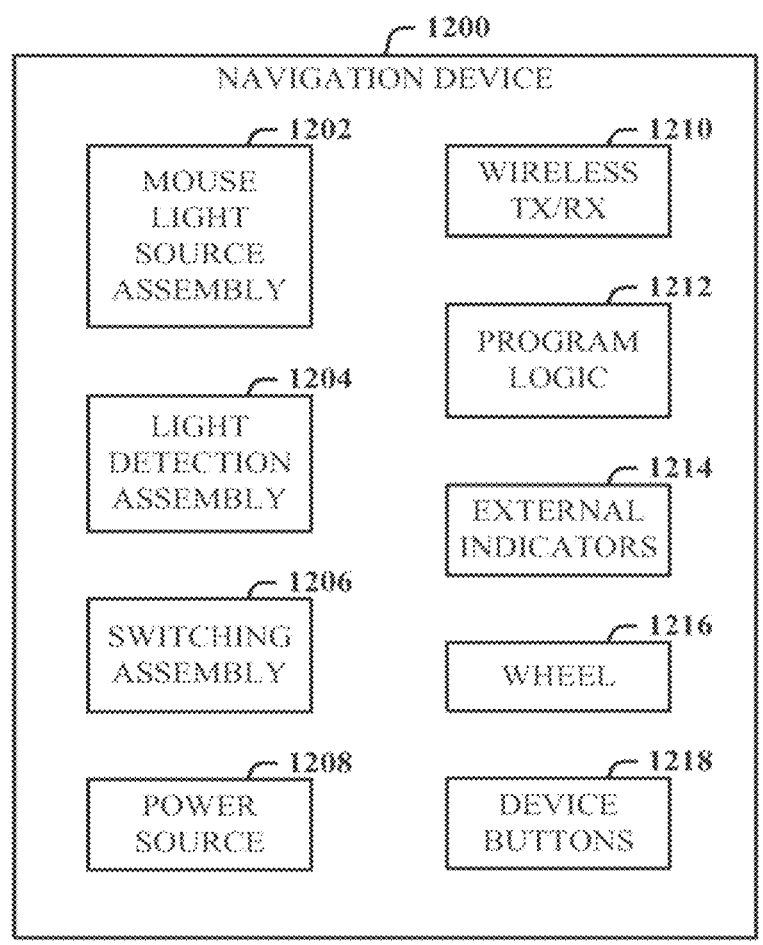
FIG. 12 illustrates a navigation device that employs the clutch height embodiments disclosed herein.

FIG. 12 illustrates a navigation device 1200 that employs the clutch height embodiments disclosed herein. The device 1200 can include a light source assembly 1202, which can include light sources such as an LED or multiple LEDs. The light source assembly 1202 can also include optical elements such as lenses, collimators, and so on, utilized to achieve the desired tracking and switching modes. The device 1200 also includes a light detection assembly 1204 for detecting reflected light from the tracking surface for both tracking and switching functions. The light detection assembly 1204 can include an image sensor (e.g., CCD, CMOS) used for tracking.

A switching assembly 1206 includes the logic for receiving a signal based on exceeding the clutch-height threshold and falling under the threshold, and switching between the various modes in accordance with the state of that signal. For example, if the state of the signal is logic high, this can correspond to exceeding the clutch-height threshold, indicating that the device 1200 tracking mode is to be disabled.

The device 1200 can also include a power source 1208 such as batteries and/or a power converter for using line power. A wireless transceiver subsystem 1210 facilitates wireless communications (e.g., Bluetooth) such as in a mouse mode, for example. Program logic 1212 provides the operating software for the device 1200 for interfacing to a computer system, for example, or other systems, onboard control of the device functions and, for processing image correlation, tracking, and tracking mode management. Optionally, external indicators 1214 can be provided to give feedback to the user for such functions as power, mode operation, and so on. A wheel 1216 can be provided for scrolling and other navigation operations normally associated with a wheel mouse. Device buttons 1218 facilitate operating the device 1200 (e.g., as a mouse). These can be programmable functions for the buttons.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 13:
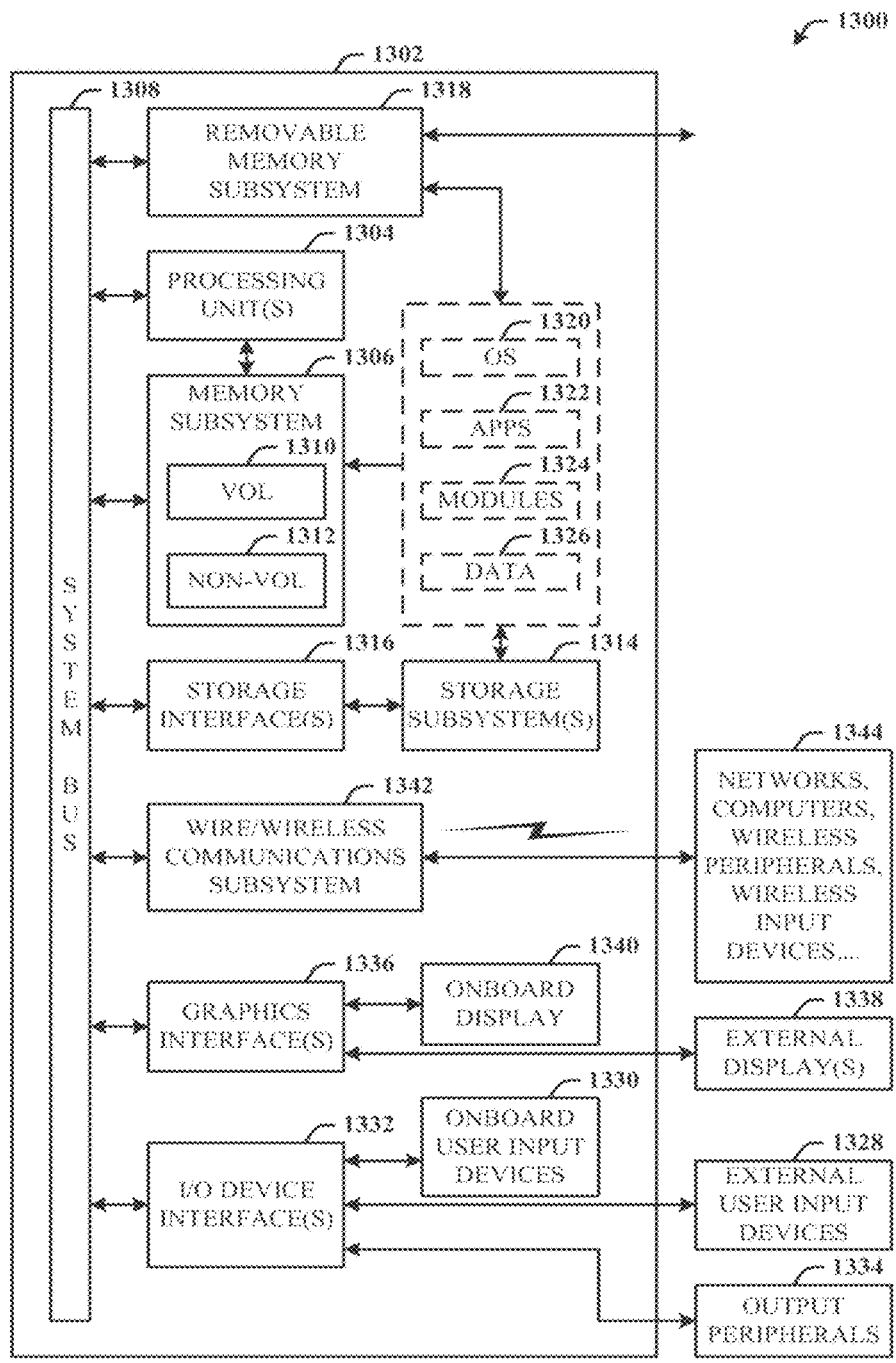
FIG. 13 illustrates a block diagram of a computing system operable to interface to a device having an adjustable clutch height in accordance with the disclosed architecture.

Referring now to FIG. 13, there is illustrated a block diagram of a computing system 1300 operable to interface to a device having an adjustable clutch height in accordance with the disclosed architecture. In order to provide additional context for various aspects thereof, FIG. 13 and the following discussion are intended to provide a brief, general description of the suitable computing system 1300 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1300 for implementing various aspects includes the computer 1302 having processing unit(s) 1304, a system memory 1306, and a system bus 1308. The processing unit(s) 1304 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1306 can include volatile (VOL) memory 1310 (e.g., random access memory (RAM)) and non-volatile memory (NON-VOL) 1312 (e.g., ROM, EPROM, EEPROM, etc.). A basic input/output system (BIOS) can be stored in the non-volatile memory 1312, and includes the basic routines that facilitate the communication of data and signals between components within the computer 1302, such as during startup. The volatile memory 1310 can also include a high-speed RAM such as static RAM for caching data.

The system bus 1308 provides an interface for system components including, but not limited to, the memory subsystem 1306 to the processing unit(s) 1304. The system bus 1308 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1302 further includes storage subsystem(s) 1314 and storage interface(s) 1316 for interfacing the storage subsystem(s) 1314 to the system bus 1308 and other desired computer components. The storage subsystem(s) 1314 can include one or more of a hard disk drive (HDD), a magnetic floppy disk drive (FDD), and/or optical disk storage drive (e.g., a CD-ROM drive DVD drive), for example. The storage interface(s) 1316 can include interface technologies such as EIDE, ATA, SATA, and IEEE 1394, for example.

One or more programs and data can be stored in the memory subsystem 1306, a removable memory subsystem 1318 (e.g., flash drive form factor technology), and/or the storage subsystem(s) 1314, including an operating system 1320, one or more application programs 1322, other program modules 1324, and program data 1326. Generally, programs include routines, methods, data structures, other software components, etc., that perform particular tasks or implement particular abstract data types. All or portions of the operating system 1320, applications 1322, modules 1324, and/or data 1326 can also be cached in memory such as the volatile memory 1310, for example. It is to be appreciated that the disclosed architecture can be implemented with various commercially available operating systems or combinations of operating systems (e.g., as virtual machines).

The storage subsystem(s) 1314 and memory subsystems (1306 and 1318) serve as computer readable media for volatile and non-volatile storage of data, data structures, computer-executable instructions, and so forth. Computer readable media can be any available media that can be accessed by the computer 1302 and includes volatile and non-volatile media, removable and non-removable media. For the computer 1302, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 1302, programs, and data using external user input devices 1328 such as a keyboard and a mouse. Other external user input devices 1328 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1302, programs, and data using onboard user input devices 1330 such a touchpad, microphone, keyboard, etc., where the computer 1302 is a portable computer, for example. These and other input devices are connected to the processing unit(s) 1304 through input/output (I/O) device interface(s) 1332 via the system bus 1308, but can be connected by other interfaces such as a parallel port, IEEE 1394 serial port, a game port, a USB port, an IR interface, etc. The I/O device interface(s) 1332 also facilitate the use of output peripherals 1334 such as printers, audio devices, camera devices, and so on, such as a sound card and/or onboard audio processing capability.

One or more graphics interface(s) 1336 (also commonly referred to as a graphics processing unit (GPU)) provide graphics and video signals between the computer 1302 and external display(s) 1338 (e.g., LCD, plasma) and/or onboard displays 1340 (e.g., for portable computer). The graphics interface(s) 1336 can also be manufactured as part of the computer system board.

The computer 1302 can operate in a networked environment (e.g., IP) using logical connections via a wire/wireless communications subsystem 1342 to one or more networks and/or other computers. The other computers can include workstations, servers, routers, personal computers, microprocessor-based entertainment appliance, a peer device or other common network node, and typically include many or all of the elements described relative to the computer 1302. The logical connections can include wire/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1302 connects to the network via a wire/wireless communication subsystem 1342 (e.g., a network interface adapter, onboard transceiver subsystem, etc.) to communicate with wire/wireless networks, wire/wireless printers, wire/wireless input devices 1344, and so on. The computer 1302 can include a modem or has other means for establishing communications over the network. In a networked environment, programs and data relative to the computer 1302 can be stored in the remote memory/storage device, as is associated with a distributed system. It will be appreciated that the network connections shown are exemplary and other means of establishing a communications link between the computers can be used.

The computer 1302 is operable to communicate with wire/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   one or more processors;
   one or more computer-readable storage devices storing computer-executable instructions being executable by the one or more processors to implement a user interface including:
   a first selectable control displayed as part of the user interface and configured to receive user input specifying an adjustable occlusion level for an aperture of a device to control an amount of light sensed by the device; and
   a second selectable control that-is displayed as part of the user interface and configured to receive user input selecting an adjustable clutch height threshold for the device.

2. A system as recited in claim 1, wherein the device comprises a mouse.

3. A system as recited in claim 1, wherein the device comprises an optical tracking device.

4. A system as recited in claim 1, wherein the user interface is presented via an application that is configured to receive settings for the device.

5. A system as recited in claim 1, wherein the user interface further includes a third selectable control that is displayed as part of the user interface and configured to receive user input to create a profile name for a specific set of device settings of the device.

6. A system as recited in claim 1, wherein the user interface further includes a third selectable control that is displayed as part of the user interface and configured to receive user input to select a profile name such that settings associated with the profile name are used to configure device settings of the device.

7. A system as recited in claim 1, wherein the user interface further includes a third selectable control that is displayed as part of the user interface and configured to enable setting of the clutch height based on attributes of a tracking surface.

8. A system as recited in claim 1, wherein the first selectable control is further configured to display a current occlusion level setting for the device.

9. A system as recited in claim 1, wherein the first selectable control is further configured to display a current clutch height threshold setting for the device.

10. A system as recited in claim 1, wherein the system is configured to push an occlusion level value provided to the first selectable control to the device, and to push a clutch height value provided to the second selectable control to the device.

11. A computer-implemented method comprising:
    causing to be displayed a user interface that includes a first selectable control configured to receive user input specifying an adjustable occlusion level for an aperture of an optical tracking device to control an amount of light sensed by the optical tracking device; and
    causing to be displayed as part of the user interface a second selectable control configured to receive user input selecting an adjustable clutch height threshold for the optical tracking device.

12. A computer-implemented method as recited in claim 11, further comprising causing a third selectable control to be displayed as part of the user interface, the third selectable control being configured to receive user input to create a profile name for a specific set of device settings for the optical tracking device.

13. A computer-implemented method as recited in claim 11, further comprising causing a third selectable control to be displayed as part of the user interface, the third selectable control being configured to receive user input to select a profile name such that settings associated with the profile name are used to configure device settings of the optical tracking device.

14. A computer-implemented method as recited in claim 11, further comprising causing a third selectable control to be displayed as part of the user interface, the third selectable control being configured to receive user input to select a tracking surface such that the clutch height is configurable based on attributes of the tracking surface.

15. A computer-implemented method as recited in claim 11, further comprising causing a current occlusion level to be displayed as part of the user interface.

16. A computer-implemented method as recited in claim 11, further comprising causing a current clutch height threshold setting to be displayed as part of the user interface.

17. A computer-implemented method as recited in claim 11, further comprising causing an occlusion level value provided to the first selectable control to be pushed to the optical tracking device.

18. A computer-implemented method as recited in claim 11, further comprising causing clutch height value provided to the second selectable control to be pushed to the optical tracking device.

19. A computer-implemented method comprising: causing to be displayed a user interface that includes a selectable control that enables a clutch height setting of an optical tracking device to be configured; and pushing a clutch height value to the optical tracking device in response to input to the selectable control.

20. A computer-implemented method as recited in claim 19, wherein the selectable control comprises an adjustable knob displayed as part of the user interface.

\* \* \* \* \*